March 27, 1956 — S. H. PAGE — 2,739,572
FOLLOW-UP DEVICE
Filed Jan. 8, 1953 — 2 Sheets-Sheet 1
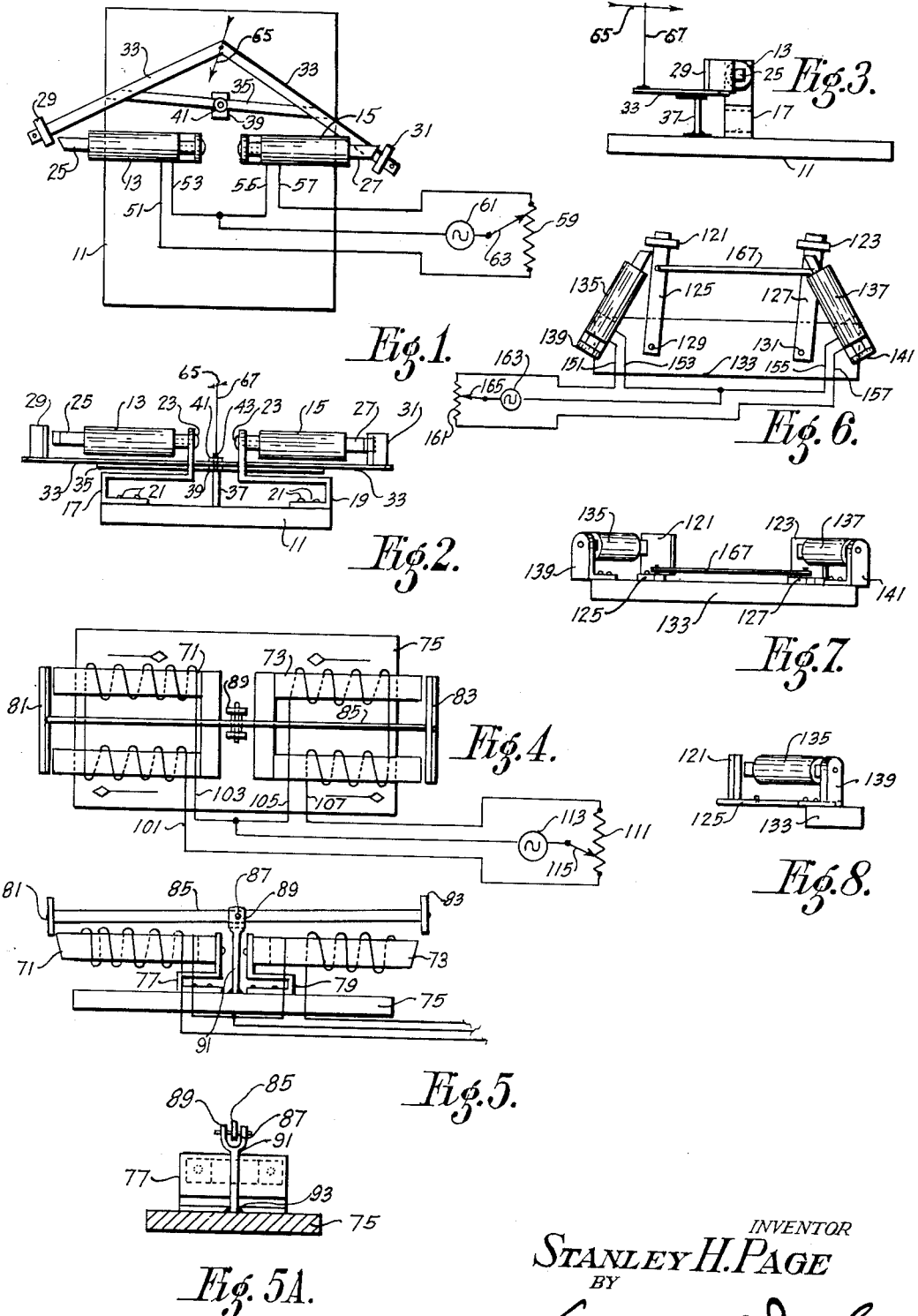
INVENTOR
STANLEY H. PAGE
BY
Lippincott & Smith
ATTORNEYS March 27, 1956 S. H. PAGE 2,739,572
FOLLOW-UP DEVICE
Filed Jan. 8, 1953 2 Sheets-Sheet 2

INVENTOR
STANLEY H. PAGE
BY
Lippincott & Smith
ATTORNEYS

United States Patent Office 2,739,572
Patented Mar. 27, 1956

2,739,572
FOLLOW-UP DEVICE

Stanley H. Page, Los Gatos, Calif.

Application January 8, 1953, Serial No. 330,249

9 Claims. (Cl. 121—41)

The present invention relates in general to remote control apparatus and in particular to apparatus operable on the electromagnetic principles to provide speed, direction and positioning control.

Within a magnetic field, the magnetomotive force is equal to the lines of flux multiplied by the reluctance of the magnetic path. When such a magnetic field is established electrically, the magnetomotive force is proportional to the number of turns wound about a ferromagnetic core multiplied by the number of amperes flowing through the coil. In utilizing mathematical relations in accordance with the foregoing principles, the invention employs a pair of electromagnets fixed upon a base in spaced relation with respect to one another. Support means is provided for carrying a pair of armatures respectively within the fields of the electromagnets. Means are provided for pivotally attaching the support to the base such that clearances are maintained between the paths followed by the armatures and the electromagnets.

Each of the coils is supplied from a single source of electromotive power, the coils being arranged in parallel relation with the source. Potentiometer means are provided in series with the coils, one terminal of the source being connected to a sliding tap movable along the potentiometer and the other terminal of the source being connected intermediate the coils. Thus, the current obtained from the source is proportionally divided between the coils depending upon the potentiometer setting; movement of the sliding tap in one direction results in an increase of current through one coil and a consequent decrease of current to the other coil. Since the torque applied to the armatures is proportional to the current flowing through the respective coils associated with the armatures, the potentiometer may be regarded as means for simultaneously and inversely varying the amount of torque applied to the respective armatures. It will be appreciated that the rotational speed of the armatures and support therefor is proportional to the rate of movement of the potentiometer tap. Likewise, the direction of rotation of the support and the instantaneous position of the armatures is under the control of the potentiometer.

Accordingly, among the objects of the invention are the following: to provide a follow-up device capable of simultaneous speed, direction and positioning control; to provide remote control apparatus simple of construction and inexpensive in the cost of manufacture; to provide apparatus of this character which is light-weight in construction and portable; and to provide remote control apparatus admitting of ready application thereof to power amplification.

Other and further objects of the invention will be apparent to those skilled in the art from a reading of the following detailed description thereof when taken in conjunction with the accompanying drawings wherein:

Fig. 1 is a semi-diagrammatic view in plan showing structure in accordance with the invention and including an electrical circuit for supplying power thereto;

Fig. 2 is an end view of the structure of Fig. 1;

Fig. 3 is a view taken in side elevation of the structure of Fig. 1;

Fig. 4 is a schematic view in plan of a modified version of the structure of Fig. 1;

Fig. 5 is a view in side elevation of the structure of Fig. 4;

Fig. 5A is a detailed segmental view of a portion of the structure of Fig. 5;

Fig. 6 shows a further modification of the invention as viewed in plan;

Fig. 7 is an end view of the modification shown in Fig. 6;

Fig. 8 is a view in side elevation of the structure of Figs. 6 and 7;

Figure 9:
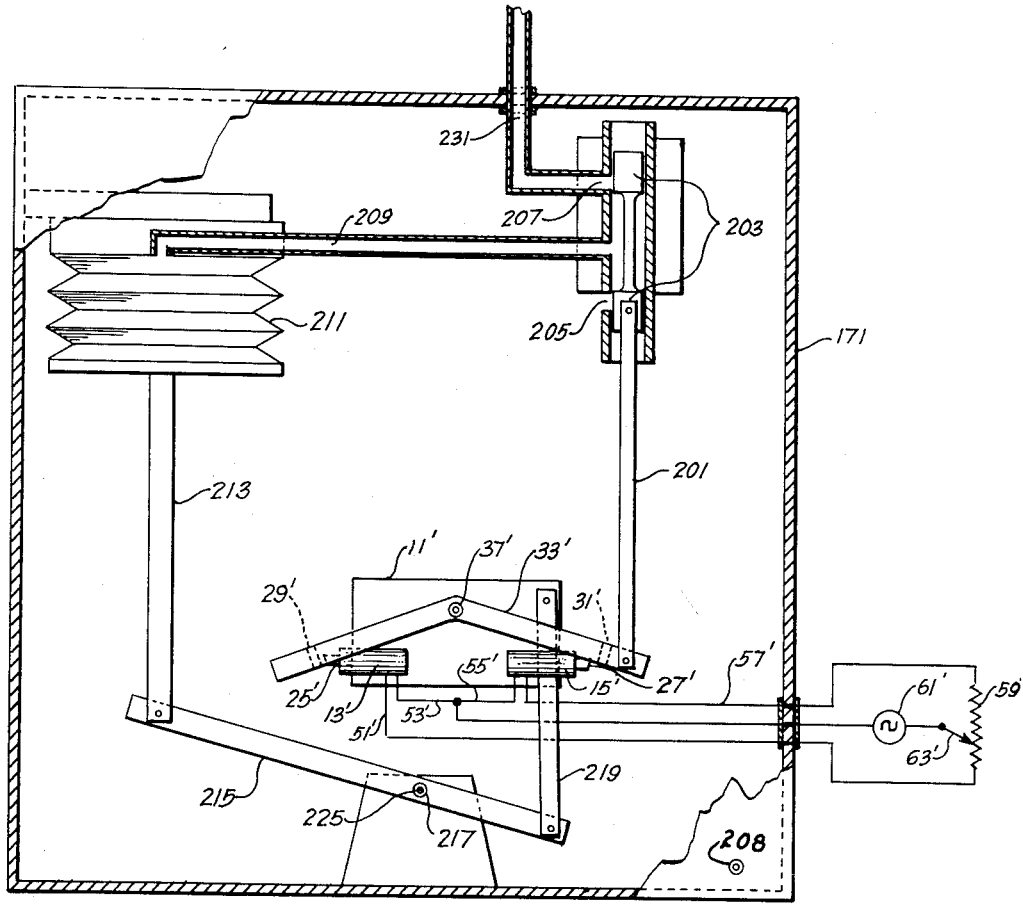
Fig. 9 is a schematic view partly in side elevation, and partly in section, showing an application of the invention to power amplification, and, Fig. 10 is a view in perspective of the housing exterior of Fig. 9.

The invention is particularly concerned with maintaining a balance of torque applied to the armatures through control of current distribution between the coils of the respective electromagnets. Considering now Figs. 1, 2 and 3, it will be seen that this is accomplished by providing a base 11 upon which is rigidly secured a pair of electromagnets 13 and 15 disposed in spaced relation and supported respectively by uprisers 17 and 19. The uprisers are suitably attached to the base as is indicated by the bolts 21. Likewise bolts 23 are provided for securing the electromagnets to the uprisers 17 and 19. It should be mentioned that any suitable clamping device or other type support may replace the uprisers as their only function is that of mounting the electromagnets on the base 11.

The electromagnets 13 and 15 are respectively provided with cores 25 and 27, preferably, although not necessarily wedge shaped around their extremities as is shown in plan in Fig. 1. A pair of armatures 29 and 31 is respectively adapted to be positioned within the magnetic fields produced by electromagnets 13 and 15 by an armature support 33. The armature support 33 may be pivotally secured to the base 11 in any conventional manner. For purposes of illustration herein a crossbar 35 is shown attached across the armature support 33 and provided with an opening to receive an uprising stub or bolt 37 which extends vertically from the base 11 and has a horizontal flange or bearing surface 39 upon which the cross arm 35 rests. A washer 41 is placed adjacent to the upper surface of the cross arm 35 and a nut 43 (Fig. 2) is then tightened on the upper end of bolt 37 to secure the armature support 33 for rotation in a horizontal plane which passes beneath the armature cores 25 and 27. With such a fixed pivot arrangement, it should be apparent that the paths followed by the armatures 29 and 31 have a directional component of motion transversely of the cores 25 and 27. The slanted faces of the cores are substantially normal to radii from the center of rotation of the armature support. Through employment of this particular structure, clearances are always maintained between the armatures 29 and 31 and the cores 25 and 27, with the magnetic fields of the electromagnets tending to urge the armatures into positions corresponding to that in which the armature 31 is shown.

Connections 51 and 53 are provided for the coil of the electromagnet 13 while connections 55 and 57 serve the coil of electromagnet 15. Leads 51 and 57 extend to a potentiometer 59 with connections 53 and 55 being joined and a source of power 61 is connected between the union of the conductors 53 and 55 and a sliding tap 63 on the potentiometer 59. Thus, the coils of the electromagnets and the potentiometer 59 form a closed loop circuit with the source of power 61 connected across each coil and its associated portion of the potentiometer resistance 59. Accordingly, movement of the potentiometer tap 63 produces an increase in current through one of the coils and a decrease in current through the other. Since the magnetomotive force of the respective fields is proportional to the current through the electromagnets, the torque effective on one of the armatures will be increased and that on the other armature will be decreased resulting in rotary movement of the support 33 until equilibrium is established in the torque applied to each armature.

The balance of torques or equilibrium inherent in the present invention is due to the fact that the armatures are so mounted with respect to their associated magnets that the total force effective on either armature is, to a first approximation, independent of its position within the range illustrated by armatures 29 and 31, and hence dependent only on the exciting current through the armature windings. The tangential component of this force, tending to produce rotation of the armatures and their supporting structure, varies with the angle between the lines of force in the airgaps (between the magnets and their respective armatures) and radii extending from the center on which the supporting structure turns tending to bring the field into parallelism with a radius and becoming zero when parallelism is achieved. For a given relative field strength between the magnets and their respective armatures, any movement of the support will increase the tangential component effective on one armature and decrease that on the other. The forces acting on the two armatures tend to produce rotation in opposite directions. Any change in relative strength of the two magnetic fields therefore causes the structure to rotate in response to the pull of the increased field which continues until the two tangential components are balanced, when the net moment becomes zero. Therefore, for any position of the potentiometer tap and consequent relative field strength there is one position of the armature support structure, and only one, where the forces are in balance. The position of armature support 33 is indicated by an arrow 65 supported on a shaft 67 extending from the support, such indication being desirable when the follow-up device is enclosed as will later be discussed.

The modified version of the invention shown in plan in Fig. 4 comprises the U-shaped electromagnets 71 and 73 secured to a base 75 by means of the uprisers 77 and 79 (Fig. 5) in the manner of the structure of the Fig. 1. A pair of armatures 81 and 83 is respectively carried within the influence of the magnetic fields produced by magnets 71 and 73 by an armature support member 85. The armature support member 85 is attached to a pin 87 supported by a yoke 89 which extends from a standard 91 secured to the base 75 as by means of the welding represented at 93 (Fig. 5A). This structure permits see-saw fashion movement of the armature support 85 to position the armatures 81 and 83 within the respective magnetic fields of electromagnets 71 and 73, with any tendency toward lateral movement being denied.

The electrical turns disposed on the arms of magnet 71 are wound in series aiding fashion such that the flux established in these coils follows the directions indicated by the diamond-shaped arrows. Likewise, the coils disposed on the legs of the magnet 73 are connected in series aiding fashion to permit the flux path to be partially closed through the armature 83. Terminal connections 101 and 103 (Fig. 4) for the coils of magnet 71 are connected to an electrical supply circuit along with terminal connections 105 and 107 of magnet 73 in the manner of the connections of Fig. 1, the wires 103 and 105 being joined and the wires 101 and 107 being connected to opposite extremities of a potentiometer 111. A source of power 113 is connected to the common wires 103 and 105 and to a sliding tap 115 on the potentiometer 111.

The operation of the structure disclosed in Figs. 4 and 5 is identical to that previously described, being capable however of operating on an increased power level basis, and consequently providing an increase in the torque applied to armature support 85. Thus, a unit to be controlled may be actuated from the armature support 85 with the control being applied through movement or a change in setting of the tap 115 on the potentiometer 111.

Figs. 6 through 8 disclose a modified form of the invention wherein armatures 121 and 123 are carried respectively by arms 125 and 127 pivotally secured in conventional manner along the axes 129 and 131 to a base 133. A pair of electromagnets 135 and 137 is rigidly affixed to the base 133 through the uprisers 139 and 141 in the manner of the structure of Figs. 1 through 3. The electrical supply circuit for the coils may be identical to that of Figs. 1 and 4 with the terminal connections 151 and 153 being provided for magnet 135 and the terminal connections 155 and 157 extending from electromagnet 137, terminal connections 153 and 155 being joined, and connections 151 and 157 extending to a potentiometer 161. A power source 163 is connected between the common terminal connections and a sliding tap 165 on the potentiometer. A cross arm 167 rigidly couples the armature support arms 125 and 127 so that movement of the armatures resulting from a change in the setting of potentiometer tap 165 is simultaneous. As in the other embodiments also, the torques applied to the respective armatures are opposed and a condition of equilibrium exists for each setting of the potentiometer tap 165.

The operation of the device disclosed in Figs. 6 through 8 is identical to that of the previously described embodiments with the exception that controlled motion of a reciprocal nature may be obtained by connecting the unit to be controlled to the cross arm 167.

It is, of course, apparent that there is a definite limitation on the amount of power obtainable for control purposes from the structure hereinbefore described. Of course, the size of the coils comprising the electromagnets may be increased sufficiently to provide control power of the order of several watts. However, if it is desired to provide remote control of, for example, organ "swell engines," marine steering engines, engine throttles, governor regulators on prime movers, and control surfaces on large aircraft, a power capacity exceeding 100 watts may be requisite.

Figure 10:
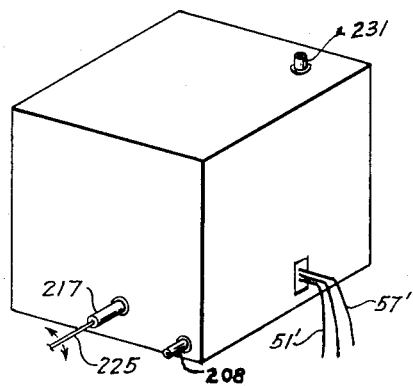

Accordingly, Figs. 9 and 10 show a suitable arrangement for power amplification obtainable through the employment of the instant remote control device. The particular embodiment shown is one employed in a swell engine, but the principles employed may be incorporated in any type of guide operated device. The remote control assembly comprising a portion of the structure shown in Fig. 9 may assume the form of that disclosed in Fig. 4 or 6, but for purposes of explanation, the unit is patterned after that described in connection with Fig. 1. Accordingly, the prime of the numbers designating component parts in the structure of Fig. 1 will be adopted throughout the description relating to the structure of Fig. 9.

Electromagnets 13' and 15' are fixed to the base 11' through, for example, upriser supports in accordance with those shown as 17 and 19 in Fig. 2. An armature support 33' is fixed to the base 11', the pair being pivotally secured to the rear wall of the housing 171 along the axis 37' to revolve in a vertical plane offset from the electromagnets in the direction of the viewer. Armatures 29' and 31', visible only in dotted outline in Fig. 9, are carried respectively within the influence of the electromagnets 13' and 15' by the armature support 33', with clearances always being maintained between the respective armatures and the wedge-shaped cores 25' and 27'. The electrical power circuit for the electromagnets 13' and 15' may be identical to that employed for the structure of Fig. 1 with the terminals 53' and 55' being common, and the terminal connections 51' and 57' extending to the potentiometer 59'. A source of power 61' is connected between the common terminal connections and the sliding tap 63' whereby movement of the tap distributes current between the coils of the electromagnets in the manner hereinbefore described.

The remaining portion of the structure shown in Fig. 9 may best be described in connection with the operation of the device. If tap 63' on potentiometer 59' is moved upward from its present position, the pull of magnet 15' on armature 31' will be increased and the torque applied to armature 29' decreased resulting in partial clockwise revolution of the armature support 33'. A vertical rod 201 pivotally secured to the right hand extremity of armature support 33' is thus caused to move downwardly and draw with it balanced piston 203, thereby opening port 205 while maintaining port 207 closed to permit high pressure fluid within housing 171 (established through valve 208 shown in Fig. 10) to flow through conduit 209 into bellows 211. Bellows 211 expands downwardly owing to gravity or if desired resilient means may be provided for this purpose and, by means of rod 213, imparts partial counterclockwise revolution to a follow-up lever 215 positioned on fulcrum 217. As the opposite extremity of the follow-up lever 215 is connected to supporting plate 11' through an upriser link 219, the plate 11' is caused to rotate counterclockwise on its fulcrum 37'. Such counterclockwise rotation of plate 11' causes electromagnet 15' to rise and draw with it the magnetically held armature 31', right hand arm of armature support 33' and vertical rod 201, thereby causing balanced piston 203 to rise to the position shown and close port 205 whereby equilibrium is again established in the system and motion of all elements ceases. As follow-up lever 215 has thus been rotated to new position it may be seen that a valve, potentiometer or other device under control, located preferably outside of the housing 171, and actuated by shaft 225 fixed on follow-up lever 215 within the pivot 217 thereof, will be oriented to a corresponding new position.

Since armature support 33' has a definite position for each setting of potentiometer 59', it will be appreciated that follow-up lever 215 and any unit under control actuated therefrom will likewise have a definite and fixed position per potentiometer setting. Thus, practically unlimited step control is provided through the apparatus of the present invention. Likewise the speed of movement of potentiometer tap 63' determines the angular speed of revolution of shaft 225.

Although the energy delivered to the electromagnets may be in the range of a few watts, the control power developed by the instant apparatus is limited only by pressure differential existing within and without the housing 171 and the effective area of the bellows 211 or an equivalent piston and cylinder assembly substituted therefore.

The principles above discussed obtain in the operation of the subject device in causing follow-up lever 215 to rotate in a clockwise direction. Thus if tap 63' is adjusted to increase the pull of magnet 13' while decreasing that of magnet 15' balanced piston 203 opens exhaust port 207 to establish communication between the bellows 211 and the atmosphere through conduits 231 and 209. This reduces the pressure within bellows 211 permitting it to collapse upwardly until the follow-up action hereinbefore described causes balanced piston 203 to close exhaust port 207 whereby equilibrium is again established and movement of all elements ceases with shaft 225 being oriented to a new position in accordance with the potentiometer setting.

What is claimed is:

1. A follow-up device comprising in combination, a base, a pair of electromagnets having oppositely oriented cores mounted on the base, a potentiometer, the coils of the electromagnets and the potentiometer being connected in electrical series relation to comprise a closed circuit, said potentiometer having a slidable tap adapted to serve as one terminal connection point for a source of current, a connection between the coils of the electromagnets adapted to serve as another connection point for a source of current, a pair of armatures, support means for the armatures mounted for oscillation relative to the base and adapted to locate the armatures respectively within the magnetic fields of the electromagnets, each of said cores having a face substantially normal to a radius of respective arcs followed by the armatures, said support means maintaining a clearance between the armatures and cores of the electromagnets whereby the force exerted on each armature is under the control of the potentiometer tap setting.

2. A follow-up device comprising in combination, a pair of electromagnets each having cores in fixed spaced relation one to another, support means, means for mounting the support means for oscillation relative to the electromagnets, a pair of armatures carried by the support means and adapted to be moved thereby respectively within the influence of the magnetic fields of the electromagnets one of the armatures following a path to approach its associated electromagnet core and the other armature moving along a path away from its associated electromagnet core, said means for mounting the support means maintaining a clearance between the paths of the armatures and the cores of the electromagnets, said cores having faces substantially normal to radii of their respective armature paths, and variable resistance means adapted to control the distribution of current from a common source to the respective electromagnets whereby said support means is positioned in accordance with the setting of the variable resistance means.

3. A follow-up device comprising in combination a pair of electromagnets positioned in fixed spaced relation one to another and each having a core oppositely oriented with respect to the other, a pair of armatures and a support therefor, means for pivotally mounting the support relative to the electromagnets and maintaining a clearance between paths followed by the armatures and the cores of the electromagnets, each of said cores having faces substantially normal to radii of paths followed by their respective armatures, terminal connections on the electromagnets adapted to be supplied with current from a common source, current distribution means connected to distribute current from the common source between the electromagnets to determine the magnetomotive force of the fields of the electromagnets applied to the respective armatures to position the same.

4. A follow-up device comprising in combination a base, a pair of electromagnets having oppositely disposed cores mounted on the base, a potentiometer, means connecting the coils of the electromagnets and the potentiometer in electrical series relation to comprise a closed circuit, said potentiometer having a slidable tap adapted to serve as one terminal connection point for a source of current, a terminal connection between the electromagnets adapted to serve as another connection point for a source of current, a pair of armatures, a support for the armatures, pivot means mounting the support for revolution on the base, said support adapted to locate the armatures respectively within the magnetic fields of the electromagnets, said cores having faces substantially normal to radii of a circle defined by support revolution, and said pivot means maintaining a clearance between the armatures and electromagnets whereby the electromagnetic force exerted on each armature is under the control of the potentiometer tap setting.

5. A follow-up device comprising in combination, a pair of electromagnets positioned in fixed spaced relation one to another and having oppositely oriented cores, a support, pivot means mounting the support for oscillation relative to the electromagnets, a pair of armatures carried by the support and positioned thereby respectively within the influence of the magnetic fields of the electromagnets, said pivot means maintaining a clearance between paths followed by the armatures and the cores of the electromagnets, each core having a face substantially normal to a radius of its armature path, variable resistance means adapted to control the distribution of current from a common source to the respective electromagnets whereby said support is positioned in accordance with the setting of the variable resistance means, and indicator means fixed to the support to show the instantaneous position thereof.

6. A follow-up device comprising in combination, a pair of electromagnets each having terminals whereat electromotive force is adapted to be applied to establish a pair of spaced magnetic fields, said electromagnets having oppositely directed cores, a pair of armatures, support means adapted to carry the armatures respectively along paths within the influence of the fields, means for pivotally mounting the support means such that a clearance is always maintained between paths followed by the armatures and the cores of the electromagnets, each of said cores having the face thereof disposed in the direction of its armature oriented substantially normal to a radius of its armature path of movement, and means for supplementarily controlling the magnetomotive force of the fields to move the armatures and support means relative to the electromagnets into positions of torque equilibrium.

7. A follow-up device comprising in combination, a pair of electromagnets each having oppositely disposed cores in fixed spaced relation one to another, a pair of armatures and a support therefor adapted to carry the armatures along paths within the influence of the respective electromagnets one armature approaching its associated electromagnet and the other armature moving away from its associated electromagnet, means for mounting the support for oscillatory movement relative to the electromagnets and maintaining a clearance between paths followed by the armatures and the cores of the electromagnets, terminal connections on the electromagnets for the application of current thereto from a common source, current distribution means connected to distribute current from the common source between the electromagnets to determine the magnetomotive force of the fields of the electromagnets applied to the respective armatures to position the same.

8. A follow-up device capable of power amplification through pressure differentials comprising in combination, a fluid impenetrable housing provided with higher internal pressure than the surrounding medium, pressure responsive means secured within the housing and adapted to provide mechanical displacements in accordance with internal and external pressure differentials effective thereon, a conduit to establish fluid communication between the pressure responsive means and the housing interior and exterior, valve means to confine communication between the pressure responsive means and the housing interior, between the pressure responsive means and the housing exterior, and to prohibit fluid passage to or from the pressure responsive means altogether, a platform and support means each mounted within the housing for movement of an oscillating nature relative thereto, magnetically responsive elements carried by the support means, means connecting the support means to the valve means for control thereof, means connecting the pressure responsive means to the platform for movement thereof in accordance with the displacement of the pressure responsive means, magnetic field producing electrical means carried by the platform and adapted to position the support means through torque applied to the magnetically responsive elements and means to control the magnetomotive forces produced by the electrical means whereby displacement of the pressure responsive means is under the continuous control of the means to control the magnetomotive forces produced by the electrical means.

9. Follow-up apparatus comprising in combination, a fluid tight housing, a platform and a support mounted within the housing for oscillatory movement relative to the housing, a pair of electromagnets fixed on the platform, a pair of armatures carried by the support and positioned respectively within the influence of magnetic fields established by the electromagnets, means for controlling the magnetomotive forces of the fields and thereby determining the position of the armatures and support therefor, means to establish a pressure differential between the interior and exterior of the housing, pressure responsive means located within the housing, a conduit for establishing fluid communication between the pressure responsive means and one of the housing interior and exterior, valve means for determining which of said one of the housing interior and exterior is in communication with the pressure responsive means, means operating the valve means from the support, and means through which the platform is moved by the pressure responsive means.

References Cited in the file of this patent

UNITED STATES PATENTS

| 471,234 | Dewar | Mar. 22, 1892 |
| 547,659 | Bradley | Oct. 8, 1895 |
| 1,818,103 | Sperry | Aug. 11, 1931 |
| 2,016,144 | Hill | Oct. 1, 1935 |
| 2,436,224 | Ogle | Feb. 17, 1948 |
| 2,437,603 | Hornfeck | Mar. 9, 1948 |

FOREIGN PATENTS

| 429,433 | Great Britain | May 27, 1935 |